United States Patent [19]

Patterson, Jr. et al.

[11] Patent Number: 4,866,111

[45] Date of Patent: Sep. 12, 1989

[54] COATING COMPOSITION

[75] Inventors: Joseph R. Patterson, Jr.; Lorrin W. Pyle, both of Cincinnati, Ohio

[73] Assignee: National Distillers and Chemical Corporation, New York, N.Y.

[21] Appl. No.: 116,839

[22] Filed: Nov. 5, 1987

[51] Int. Cl.[4] .............................................. C08L 1/18
[52] U.S. Cl. ..................................................... 524/32
[58] Field of Search ................................... 524/31, 32

[56] References Cited

U.S. PATENT DOCUMENTS

| | | | |
|---|---|---|---|
| 2,200,429 | 5/1940 | Perrin et al. | 526/235 |
| 2,394,960 | 2/1946 | Young | 526/216 |
| 2,395,381 | 2/1946 | Squires | 526/195 |
| 3,321,420 | 5/1967 | Unger | 524/32 |
| 3,476,694 | 11/1969 | Bowman et al. | 524/32 |
| 3,503,909 | 3/1970 | Bowman et al. | 524/32 |
| 3,594,338 | 7/1971 | Hoh et al. | 524/32 |
| 3,933,703 | 1/1976 | Di Giacomo et al. | 524/32 |

Primary Examiner—John Kight
Assistant Examiner—Nathan M. Nutter
Attorney, Agent, or Firm—Kenneth D. Tremain

[57] ABSTRACT

A coating composition comprising nitrocellulose; a copolymer of ethylene and an ethylenically unsaturated ester of a saturated fatty acid, said copolymer comprising between about 40% and about 90% by weight of said ester, said copolymer characterized by a kinematic viscosity at 140° C. of up to about 30,000 centipoise, said copolymer present in an amount of more than about 25% to about 60% by weight, based on the total weight of said nitrocellulose and said copolymer; and an organic solvent system for said nitrocellulose and said copolymer is disclosed.

10 Claims, 6 Drawing Sheets

COATING COMPOSITION

BACKGROUND OF THE INVENTION

1. Field of the Invention

The instant invention is directed to a coating composition comprising a nitrocellulose, a copolymer of ethylene and an ethylenically unsaturated ester of a fatty acid and an organic solvent for the nitrocellulose and the copolymer. More preferably, the present invention is directed to a coating composition comprising nitrocellulose, a copolymer of ethylene and vinyl acetate and an organic solvent for the nitrocellulose and the ethylene-vinyl acetate copolymer.

2. Background of the Prior Art

The use of nitrocellulose in coating compositions has long been established in the art. Nitrocellulose lacquers provide protection and decoration on surfaces to which they are applied. Although nitrocellulose-based lacquers provide excellent coatings, these coating compositions are oftentimes found wanting when applied to polar surfaces. Particularly, polyolefin and metal surfaces, which those skilled in the art are aware are polar, are not satisfactorily coated with nitrocellulose coatings.

This problem has been addressed in the prior art. U.S. Pat. 3,321,420 to Unger advances a class of nitrocellulose-based coating compositions which include a copolymer of ethylene and an ethylenically unsaturated ester of a saturated fatty acid. Such coating compositions are recited in Unger to possess unusually good flexibility, scuff resistance, freedom from blocking, tensile strength, resistance to migration of ink colors to protective overcoats and good adhesion.

Although the Unger patent represents a significant advance in the art, especially in the coating of polar surfaces such as metals and polyolefins films, still certain problems associated with the use of these coatings are not addressed by that teaching. Of significant importance is the constituency of the organic solvent in which the polymers, nitrocellulose and a copolymer of ethylene and ethylenically unsaturated ester of a saturated fatty acid, are dissolved. Unger advises that the solvent system should include a hydrocarbon type solvent such as toluene and an organic polar solvent, for example, an alkanol such as butanol, an ester such as butyl acetate or a ketone such as methyl ethyl ketone.

The importance of environmental health and safety emphasizes the desirability of increasing the use of polar organic solvents, such as alkanols, and the concurrent decrease in the employment of aromatic hydrocarbons such as toluene, in coating compositions. Those aware of environmental problems appreciate that aromatic hydrocarbons are volatile and are suspected of detrimental health effects. Polar solvents, on the other hand, are less volatile and present far fewer health dangers. In the past, however, the solubility of a blend of nitrocellulose and a copolymer of ethylene and an unsaturated ester of a saturated fatty acid has prevented the concentration of polar solvents to be significantly increased. Thus, aromatic hydrocarbons, such as toluene, have predominated in nitrocellulose coating compositions.

The above remarks establish the need in the art for a new composition of nitrocellulose and a copolymer of ethylene and an ethylenically unsaturated ester of a saturated fatty acid having good coatability, especially on polar surfaces, in which the organic solvent system includes increased concentrations of polar solvents.

BRIEF SUMMARY OF THE INVENTION

The present invention is directed to a new coating composition having excellent properties for coating polar surfaces which composition is easily dissolved in a solvent system which comprises a greater amount of a polar solvent than the solvent systems for similar coating compositions in the prior art.

In accordance with the present invention a coating composition is provided. The composition comprises nitrocellulose; a copolymer of ethylene and an ethylenically unsaturated ester of a saturated fatty acid, said copolymer comprising between about 40% and about 90% by weight of said ester, said copolymer characterized by having a kinematic viscosity at 140° C. of up to about 30,000 centipoise. The copolymer is present in a concentration of between about 20% and about 60% by weight, based on the total weight of said nitrocellulose and said copolymer; and an organic solvent for said nitrocellulose and said copolymer.

BRIEF DESCRIPTION OF THE DRAWINGS

The instant invention may be better understood with reference to the accompanying drawings of which.

DETAILED DESCRIPTION

Figure 1:
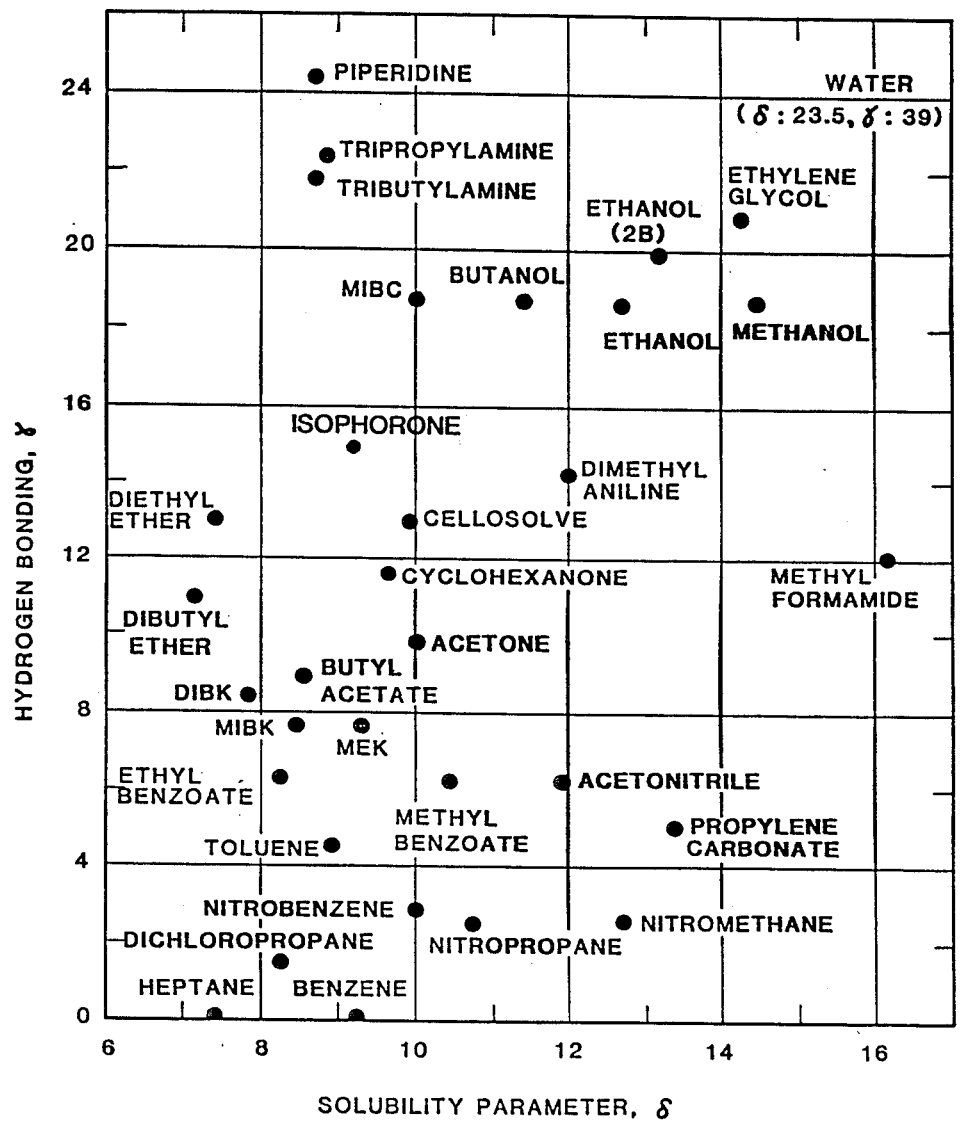
FIG. 1 is a solubility map, defined by hydrogen bonding as a function of solubility parameter, for a plurality of organic solvents.

The present invention is directed to a coating composition comprising an organic solvent solution of nitrocellulose and a copolymer of ethylene and an ethylenically unsaturated ester of a saturated fatty acid. Specifically, the copolymer, comprising between about 40% and about 90% by weight of the ester, has a kinematic viscosity, at 140° C., of up to about 30,000 centipoise and is present in the composition in an amount of between more than about 25% and about 60% by weight, based on the total weight of the nitrocellulose and the copolymer.

In a preferred embodiment of the coating composition of this invention, the copolymer is comprised of about 50% to about 80% by weight of the ester. More preferably, the copolymer comprises between about 55% and about 65% by weight of the ester. Most preferably, the copolymer comprises about 60% by weight of the ester.

In an embodiment of the composition of the present invention the kinematic viscosity of the copolymer at 140° C. is in the range of between about 1,500 and about 30,000 centipoise. More preferably, the kinematic viscosity, at 140° C., of the ethylene-unsaturated ester copolymer is about 3,000 to about 30,000 centipoise. Still more preferably, the kinematic viscosity at 140° C. of the copolymer is in the range of between about 8,000 and about 9,000 centipoise.

In still another embodiment of this invention, the copolymer is present in an amount of between about 30% and about 50% by weight, based on the total weight of the nitrocellulose and copolymer. More preferably, the copolymer is present in a concentration of between about 35% and about 45% by weight, based on the total weight of the nitrocellulose and the copolymer. Most preferably, copolymer comprises about 40% by weight, based on the total weight of the nitrocellulose and the copolymer.

The ethylenically unsaturated ester of a saturated fatty acid of the copolymer of the coating composition of this invention has the general formula RCOOR' in which R is selected from the group consisting of hydrogen and straight or branched chain alkyl radicals; and R' is an radical having a terminal $CH_2=C$ group. Suitable alkyl radicals are those containing from 1 to about 18 carbon atoms exemplified by methyl, ethyl, propyl, isopropyl, butyl, isobutyl, secondary butyl, tertiary butyl, straight and branched chain amyl and straight and branched chain hexyl. Among the alkyl radicals, within the scope of the present invention, containing more than 6 carbon atoms, are straight and branched chain heptyl, octyl, nonyl, decyl, undecyl, dodecyl, octadecyl and the like.

Among the alkenyl radicals within the contemplation of this invention are those having from 2 to about 12 carbon atoms, preferably from 2 to about 6 carbon atoms. Among the preferred group of alkenyl radicals containing 2 to about 6 carbon atoms are vinyl, allyl, isopropenyl, butenyl, pentenyl and hexenyl. Of the higher alkenyls, heptenyl, octenyl, nonenyl, undecenyl and dodecenyl radicals, each having a terminal $CH_2=C<$ group, are preferred.

Among the ethylenically unsaturated esters of saturated fatty acids within the contemplation of the coating composition of this invention are vinyl formate, vinyl acetate, vinyl propionate, allyl acetate, allyl propionate, isopropenyl butyrate, hexenyl acetate, pentenyl hexanoate, allyl octanoate, nonenyl pentanoate, decenyl acetate, vinyl decanoate, propenyl undecanoate, vinyl dodecanoate, dodecenyl propionate, vinyl stearate and the like. Of these ethylenically unsaturated esters of saturated fatty acids, vinyl acetate is most preferred.

Although all commercial types and grades of nitrocellulose, irrespective of the method of manufacture, are within the contemplation of this invention those particular commercial grades having nitrogen contents of from about 10.9% to about 13.5% by weight, based on the total weight of the nitrocellulose, are preferred. Two commercial grades of nitrocellulose are particularly preferred in the coating composition of the present invention. The first is a nitrocellulose containing about 11.8% to about 12.2% nitrogen by weight, based on the total weight of the nitrocellulose. The second particularly preferred nitrocellulose grade within the contemplation of the coating composition of this invention is nitrocellulose containing about 10.9% to about 11.2% nitrogen by weight, based on the total weight of the nitrocellulose.

The coating composition of this invention may optionally include conventional additives such as fillers, pigments, dyes, plasticizers, resins, waxes and the like. These additives may be present in small amounts sufficient to effect the desired results obtained by the inclusion of these additives. For example, coloring, moistureproofing, heat sealing and glossing characteristics may be imparted by the inclusion of these additives. In general, the additives should not exceed 50% by weight, based on the total weight of the nonvolatile components of the composition, where the nonvolatile components comprise nitrocellulose, the copolymer and the additives. More preferably, the additives should not exceed 30% by weight of the nonvolatile components. The critical limitation is that the additives do not have a deleterious effect on the desirable characteristics of the nitrocellulose and copolymer.

The coating composition of this invention is prepared by well-known conventional methods. Usually, it is merely necessary to dissolve and homogeneously blend the nitrocellulose and the copolymer of ethylene and an ethylenically unsaturated ester of a saturated fatty acid, optionally together with one or more desired additives, in a solvent system. The resultant coating composition is applied by spraying, dipping, roller coating, spreading with a doctor blade or rod, printing or the like. The coated surface is then air dried at ambient or at elevated temperature to evaporate the volatile solvent and deposit the nonvolatile components of the composition as a homogeneous adherent coating on the substrate surface.

The following examples are given to illustrate the scope of the present invention. Because these examples are given for illustrative purposes only, the coating composition of this invention should not be limited to the exemplified embodiments.

EXAMPLE 1

Solubility Map of Commercial Solvents

A plurality of commercially important solvents utilizable in coating compositions were plotted on a standard curve of solubility parameter, in joules per cubic centimeter, as a function of hydrogen bonding, in accordance with the procedure set forth in ASTM Test Procedure 3132. The solvents tested were benzene, toluene, nitrobenzene, methyl benzoate, ethyl benzoate, heptane, dichloropropane, nitropropane, nitromethane, acetonitrile, propylene carbonate, diisobutyl ketone (DIBK), methylisobutyl ketone (MIBK), methylethyl ketone (MEK), diethyl ether, dibutyl ether, acetone, cyclohexanone, methanol, ethanol, ethanol (2B) (ethanol denatured with toluene), butanol, ethylene glycol, Cellusolve, butyl Cellusolve, methylisobutyl Carbitol (MIBC), methyl formamide, dimethyl aniline, tripropylamine, tributylamine and piperidine.

The results of this example are plotted in FIG. 1.

EXAMPLE 2

Solubility Map of an Ethylene-Vinyl Acetate Copolymer

The solubility of an ethylene-vinyl acetate copolymer, Vynathene [trademark]EY 80069, an ethylene-vinyl acetate copolymer, having a kinematic viscosity of 9,000 centipoise at 140° C., which comprises 62 weight percent vinyl acetate was mapped from 20% solutions in accordance with the procedure enumerated in a ASTM Test Procedure 3132. This map, depicting hydrogen bonding as a function of the solubility parameter, appears in FIG. 2.

This solubility map employed the same coordinates used to plot the individual solubility of the solvents tested in Example 1. As those skilled in the art are aware, solvent systems characterized by a hydrogen bonding as a function of solubility parameter falling under the curve defined this solubility map dissolve the ethylene-vinyl acetate copolymer of this example. Those solvent systems falling outside this curve do not dissolve this ethylene-vinyl acetate copolymer.

COMPARATIVE EXAMPLE 1

Solubility Map of an Ethylene-Vinyl Acetate Copolymer

The solubility of an ethylene-vinyl acetate copolymer, outside the scope of the coating composition of the present invention, Vynathene [trademark]EY 902-30, (40 to 43 weight percent vinyl acetate) was generated in accordance with ASTM Test Procedure 3132. The copolymer had a melt flow rate of 8.5 grams/10 minutes as measured by ASTM Test Procedure D-1238, Condition B which corresponds to a kinematic viscosity of approximately 1,000,000 centipoise at 140° C. It was generated on coordinates identical with those of FIGS. 1 and 2.

Figure 2:
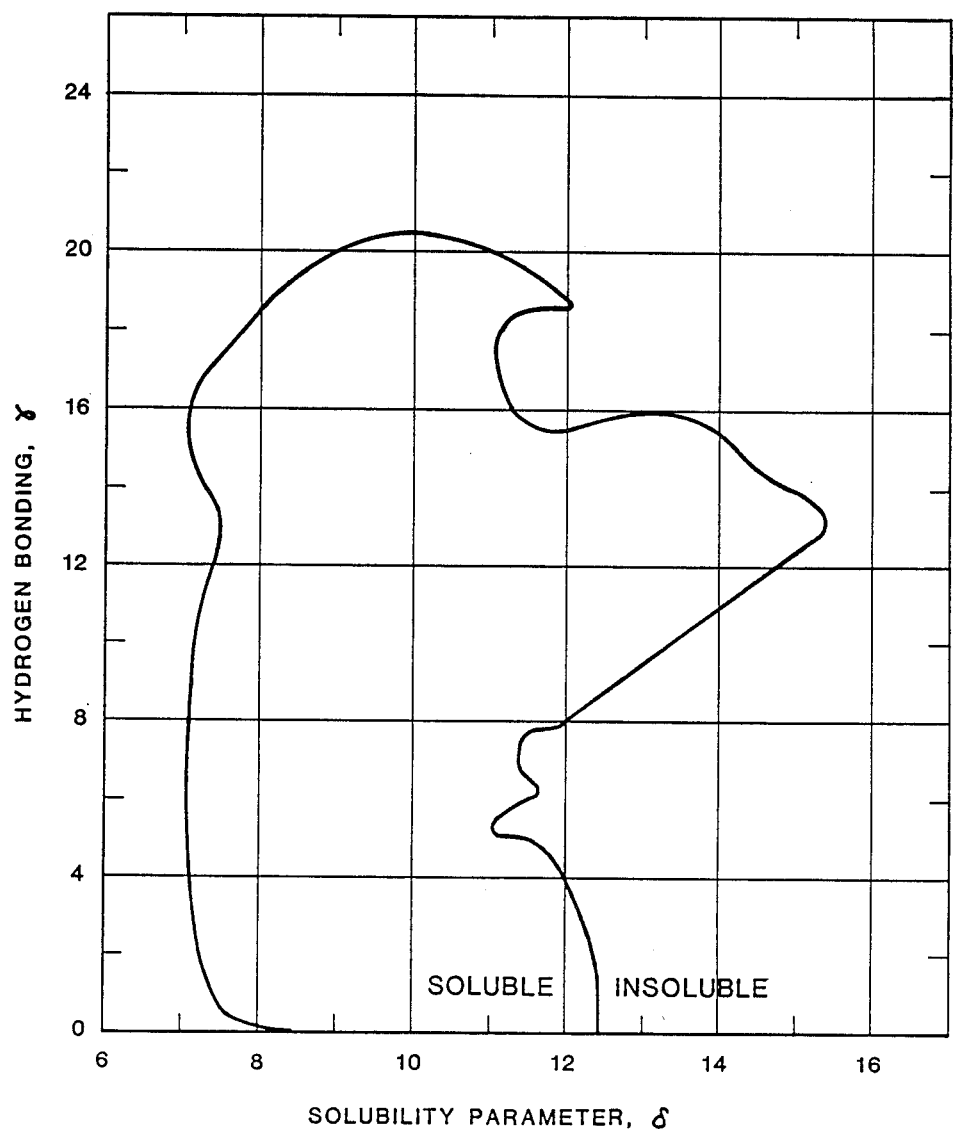
FIG. 2 is a solubility map of an ethylene-vinyl acetate copolymer within the scope of the present invention.

The procedure for generating this curve was identical to that employed in the generation of FIG. 2 in Example 2 except that in this example the solubility map was generated from 5% solutions rather than the 20% solutions employed in the preparation of FIG. 2. It is emphasized that ASTM Test Procedure 3132 permits generation of solubility maps from either of these concentrations.

Figure 3:
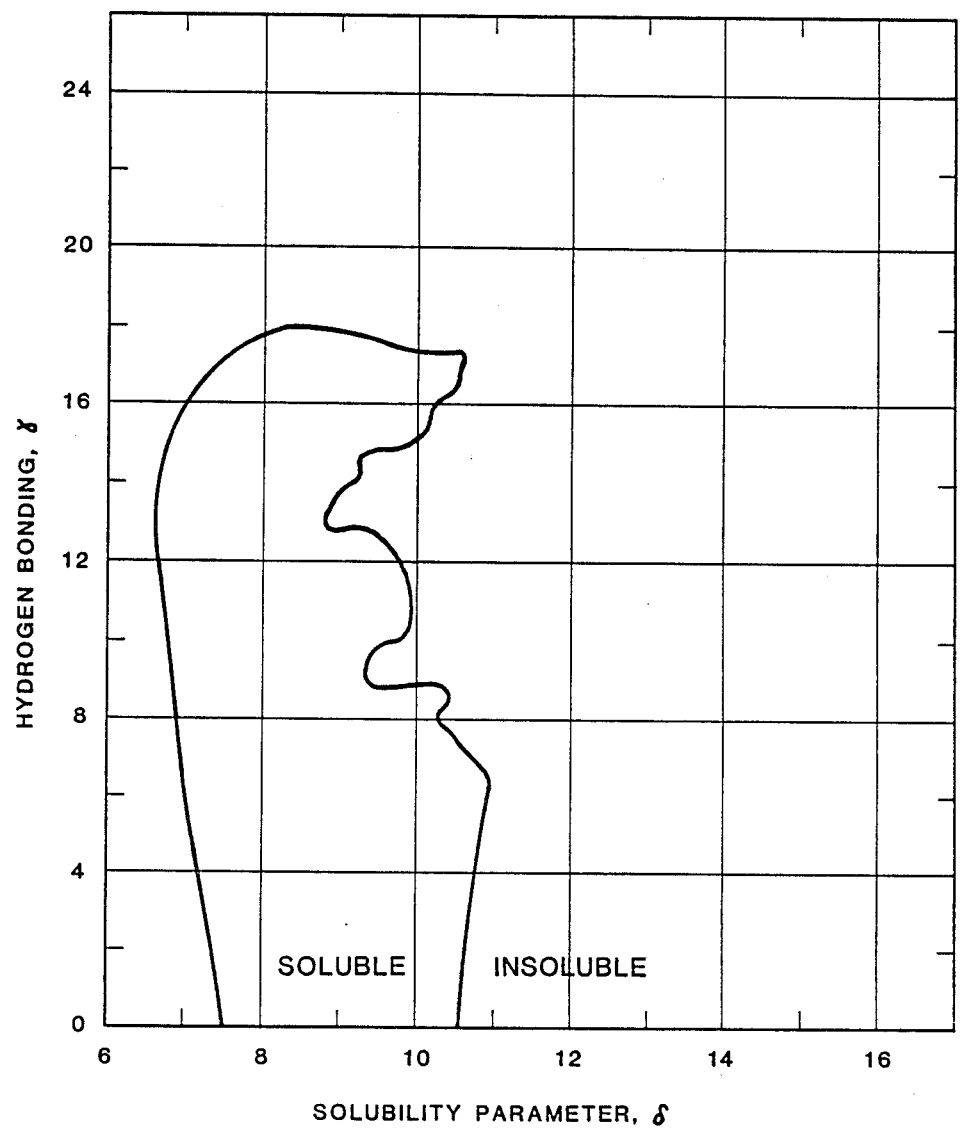
FIG. 3 is a solubility map of an ethylene-vinyl acetate copolymer outside the scope of the present invention.

The solubility map of this polymer appears as FIG. 3.

EXAMPLE 3

Solubility Map of Two Grades of Nitrocellulose

A solubility map of SS ½ second grade nitrocellulose, a nitrocellulose characterized by a nitrogen concentration of about 10.9% to about 11.2% by weight, based on the total weight of the nitrocellulose, and RS ½second grade nitrocellulose characterized by a nitrogen concentration of about 11.8% to about 12.2% by weight, based on the total weight of the nitrocellulose, were each prepared in accordance with ASTM Procedure D-3132 utilizing, in each case, 5% solutions of the nitrocellulose blends. These nitrocellulose grades are described in detail in Hercules Product Booklet CSL 204 which is incorporated herein by reference.

Figure 4:
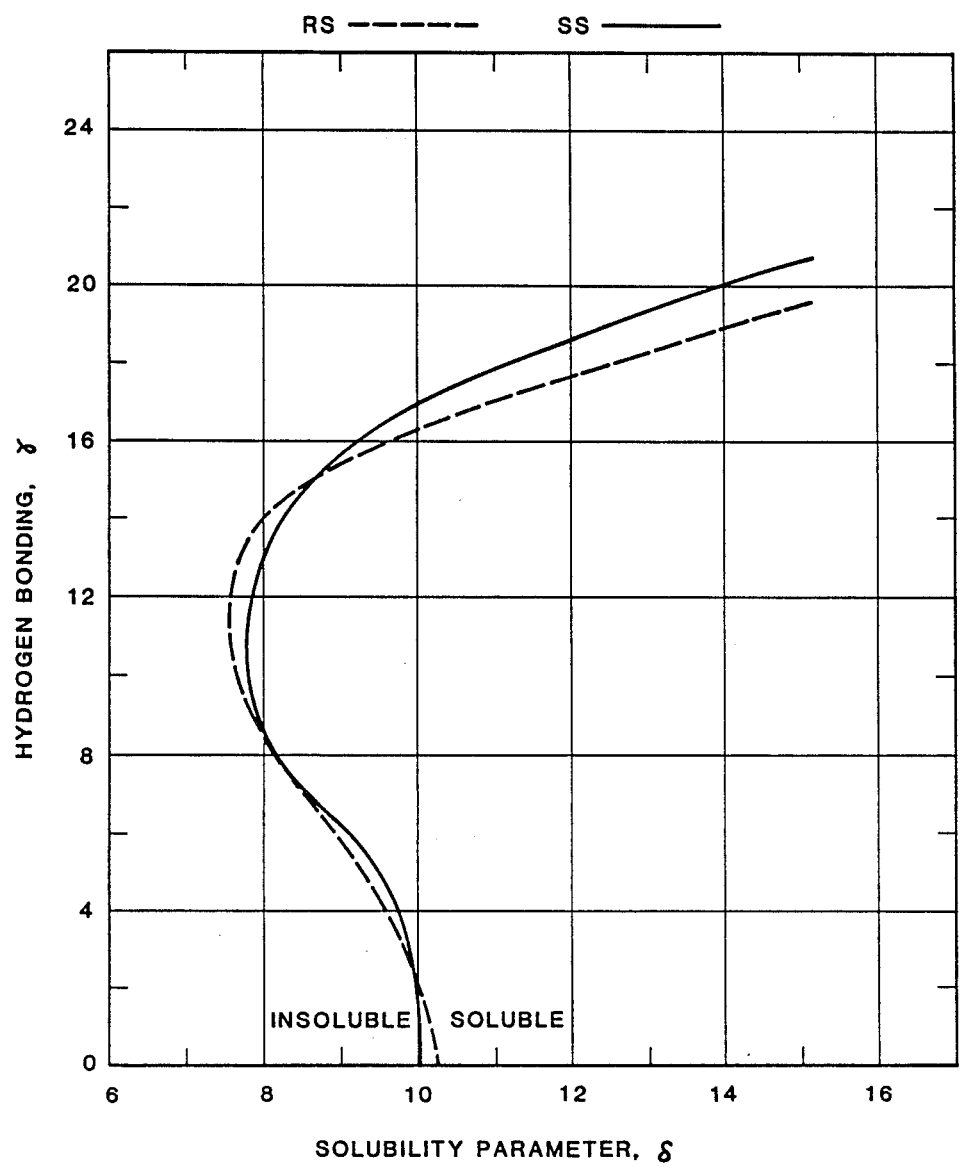
FIG. 4 is a solubility map of two grades of nitrocellulose within the scope of the present invention.

The results of this solubility mapping appears in FIG. 4. It is noted that the dotted line indicates the RS grade and the solid line indicates the SS grade. Solubility systems whose hydrogen bonding as a function of solubility parameter falls to the left of the curves are insoluble and those to the right of the curve are soluble in the respective nitrocellulose grades.

EXAMPLE 4

Solubility Map of Nitrocellulose-Ethylene-Vinyl Acetate Coating Composition

In that FIGS. 1, 2 and 4 are on common coordinates, the solubility curve for the ethylene-vinyl acetate copolymer of FIG. 2 was superimposed on the solubility map of FIG. 1. Furthermore, the solubility maps of the nitrocellulose grades of FIG. 4 were also superimposed on this map. The resultant solubility map appears as FIG. 5.

This figure defines those solvent systems that dissolve a mixture of RS grade or SS grade nitrocellulose with the ethylene-vinyl acetate copolymer of Example 2.

Thus, the darkened area defines the solvent systems which dissolve a mixture of the copolymer of FIG. 2 and the nitrocellulose grades of FIG. 3.

COMPARATIVE EXAMPLE 2

Solubility Map of Nitrocellulose-Ethylene-Vinyl Acetate Coating Composition

The solubility map of the ethylene-vinyl acetate copolymer outside the scope of the present invention, defined in Comparative Example 1 and depicted in FIG. 3, was superimposed on the solvent system map of FIG. 1. As in Example 5, the solubility of the nitrocellulose grades of Example 3 was also superimposed on this map.

Figure 6:
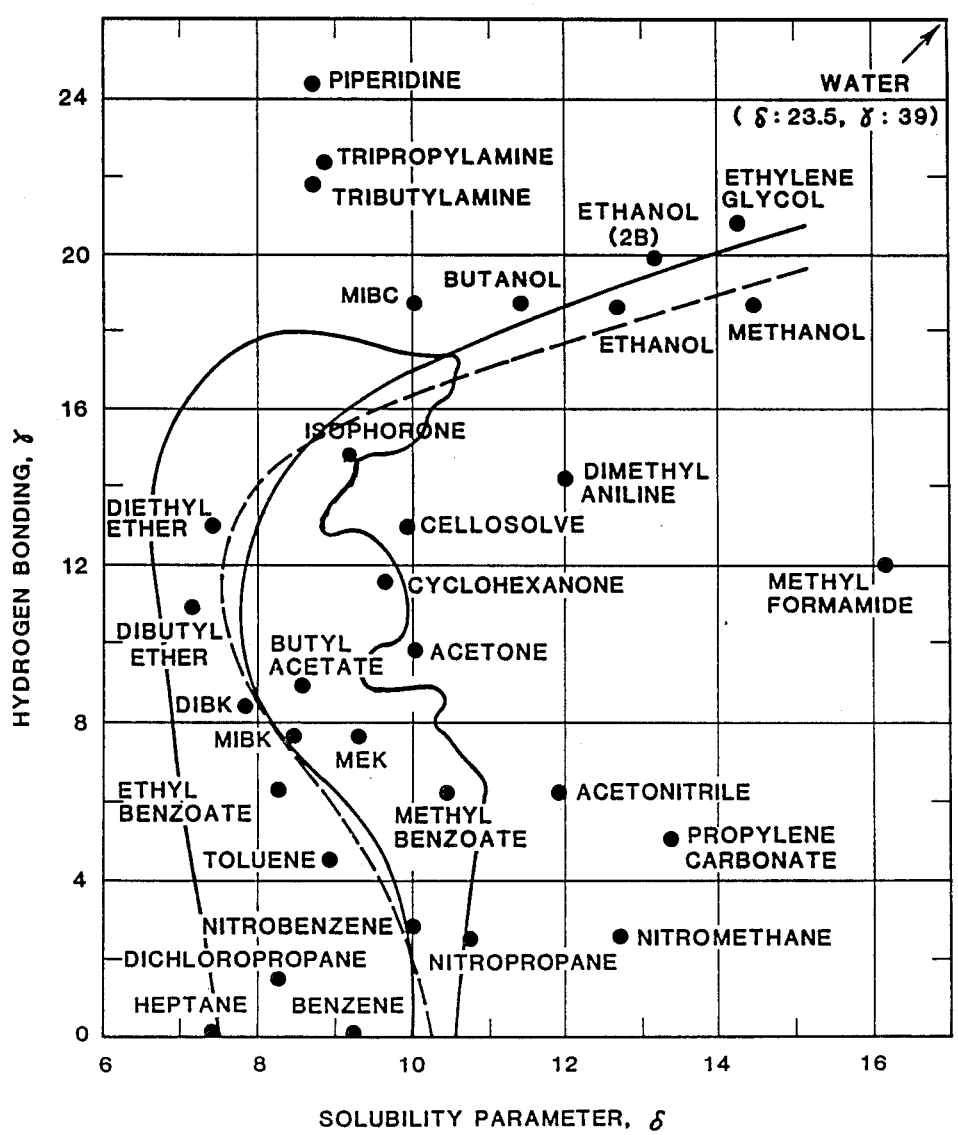
FIG. 6 is a curve superimposing the solubility characteristics of the copolymer of ethylene and vinyl acetate of FIG. 3 and the nitrocellulose of FIG. 4 on the solubility map of FIG. 1.

The resultant solubility map, depicting the solubility systems which dissolve these nitrocellulose-ethylene-vinyl acetate copolymer systems, are shown in FIG. 6 by the darkened areas.

DISCUSSION OF FIGS. 5 AND 6

Figure 5:
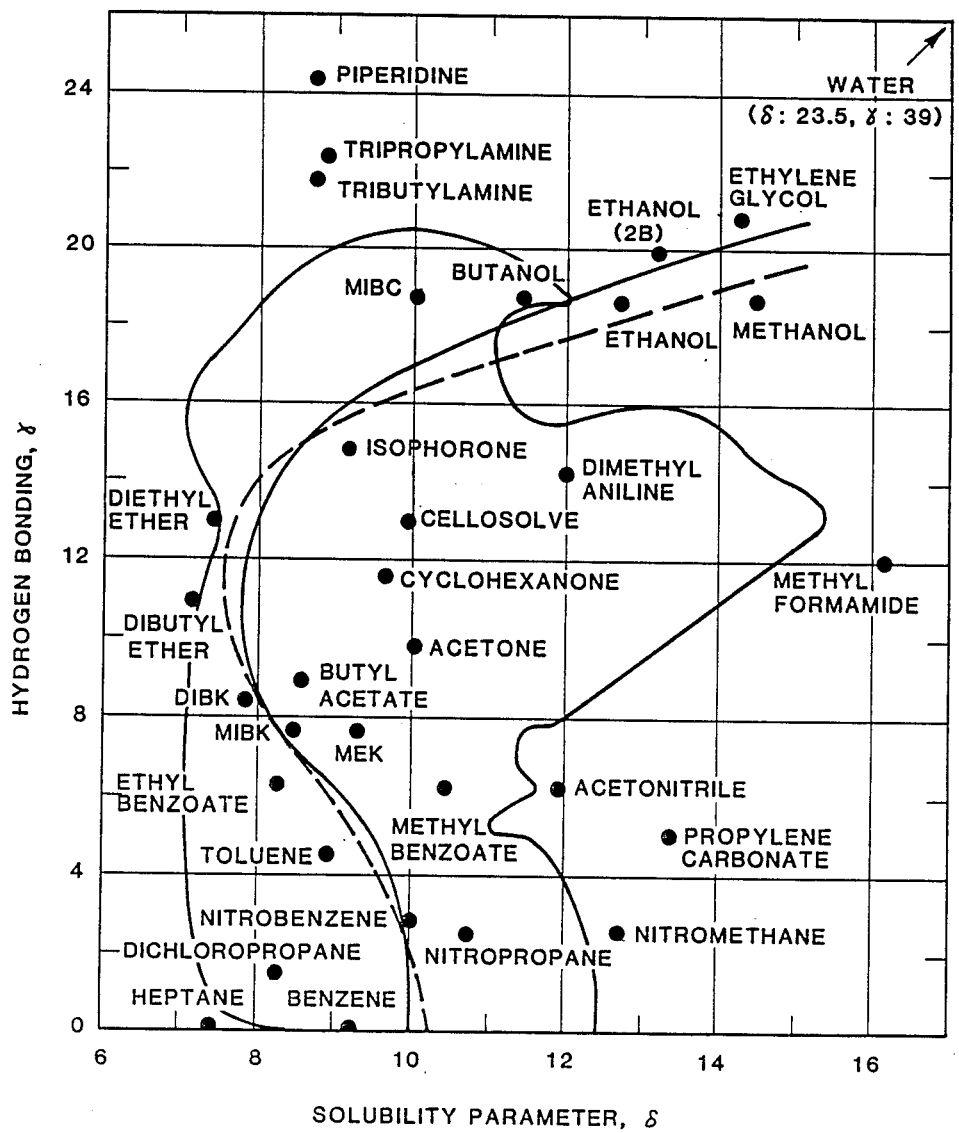
FIG. 5 is a curve superimposing the solubility characteristics of the copolymer of ethylene and vinyl acetate of FIG. 2 and the nitrocellulose of FIG. 4 on the solubility map of FIG. 1.

FIG. 5 depicts a solubility curve utilizing an optimum coating composition within the scope of the present invention. That is, the ethylene-vinyl acetate copolymer of this blend is 62% by weight vinyl acetate and has a kinematic viscosity at 140° C. of 9,000 centipoise. It is noted that either the RS or SS grades of nitrocellulose provide a large area of solvent systems that dissolves this mixture.

On the other hand, FIG. 6, which differs from FIG. 5 in that it depicts the solubility curve obtained using an ethylene-vinyl acetate copolymer which is outside the scope of the present invention, i.e., a melt flow rate of 8.5, equivalent to a kinematic viscosity of 1,000,000 centipoise at 140° C., demonstrates a much smaller area of solvent systems that dissolves the copolymer.

Since the area under the curve is greater when using a coating composition in accordance with the present invention, that is, utilizing a copolymer of ethylene and an unsaturated ester of a saturated fatty acid having a kinematic viscosity at 140° C. of up to about 30,000 centipoise, the number of solvent systems that can be utilized is much greater. It follows that, because of the greater latitude provided by compositions within the scope of the present invention, more polar solvent blends can be utilized.

Those skilled in the art are aware that polar solvents are less volatile, environmentally safer and generally easier to handle. Indeed, prior art copolymers of ethylene and unsaturated esters are characterized by an inability to fully exploit the advantages obtainable by utilization of ethylene-unsaturated esters of saturated fatty acids copolymers because of the difficulty of obtaining a solvent system that dissolves such polymers with nitrocellulose. That this is so is evidenced by an analysis of FIGS. 5 and 6. FIG. 5 of the present invention establishes that such important polar solvents as acetone and Cellosolve dissolve the copolymer of ethylene and vinyl acetate. However, FIG. 6 demonstrates that the copolymer of ethylene and vinyl acetate outside the scope of the present invention, is not dissolved by these common polar solvents.

EXAMPLES 5 AND 6 AND COMPARATIVE EXAMPLES 3 AND 4

Solubility of Ethylene-Vinyl Acetate Copolymers in Alkanol-Containing Solvents

Four ethylene-vinyl acetate (EVA) copolymers were tested to determine their solubility in mixtures of toluene and four alkanols: 200 proof ethanol, 190 proof ethanol, n-butyl alcohol and anhydrous isopropyl alcohol.

Twenty-five grams of each copolymer was dissolved in 75 g. toluene. To this solution was added each of the four above-identified alkanols. The amount added was the minimum weight in grams required to cause permanent cloudiness or precipitation.

Two of the EVA copolymers tested were outside the scope of the present invention because their kinematic viscosities at 140° C. were above 30,000 centipoises. Thus, the EVA of Comparative Example 3, Vynathene (trademark) EY 902-30, has a kinematic viscosity at 140° C. of approximately 1,000,000 centipoise and the EVA of Comparative Example 4, Vynathene (trademark) EY 80041, has a kinematic viscosity at 140° C. of 35,000 centipoise. The two EVA copolymers of the present invention, Vynathene (trademark) EY 80042, of Example 5 Vynathene (trademark) EY 80069 of Example 6, have kinematic viscosities at 140° C. of 3,000 centipoise and 9,000 centipoise, respectively.

The results of these examples are summarized in Table I.

TABLE I

| Component | Weight of Alkanol Required to Exceed Solubility | | | |
|---|---|---|---|---|
| | C.E. 3 | C.E. 4 | 5 | 6 |
| EVA copolymer | VA = 40–43% | VA = 40–42% | VA = 40–42% | VA = 62% |
| Wt. EVA, gm. | 25 | 25 | 25 | 25 |
| Wt. Toluene, gm. | 75 | 75 | 75 | 75 |
| Wt, Ethanol (200 pf), gm. | 65.0 | 74.7 | 111.0 | 159.0 |
| Wt, Ethanol (190 pf), gm. | 27.6 | 31.7 | 51.4 | 91.0 |
| Wt, n-Butyl Alcohol, gm. | 198.0 | 304.0 | 304.0 | Infinite |
| Wt, iso-Propyl Alcohol, gm. | 117.3 | 151.0 | 150.0 | Infinite |

The results of this test establish the improved results obtained by the use of the EVA polymers of the present invention, having kinematic viscosities at 140° C. of between about 1,500 and about 30,000 centipoise, compared to those outside of the EVA polymers of the coating composition of this invention, having kinematic viscosities at 140° C. of more than 30,000 centipoise.

For example, attention is directed to Example 6. The amount of each of the four alkanols dissolvable in the solution of 25 grams of this EVA in 75 gms of toluene significantly exceeded the weight of these alkanols in the EVA's of Comparative Examples 3 and 4 having kinematic viscosities at 140° C. exceeding 30,000 centipoise. While Example 5 utilized an EVA having substantially the same vinyl acetate concentration, within the scope of the present invention, as the EVA's of Comparative Examples 3 and 4, it too was superior in its greater solubility in 200 proof and 190 proof ethanol. It is noted, however, that its performance in n-butyl alcohol and isopropyl alcohol was substantially the same as the EVA's of Comparative Examples 3 and 4.

EXAMPLE 7 AND COMPARATIVE EXAMPLES 5 AND 6

Coating Characteristics on Flame-Treated Polyethylene Surfaces

The use of coatings on polyethylene surfaces have long been a problem in the art. Even when polyethylene surfaces were flame or corona treated to improve coating adhesion, surface coating characteristics were oftentimes inadequate. To establish the value of the coating compositions within the contemplation of the present invention, they were tested by being coated on a polyethylene surface. In addition, these coatings were compared to those of the prior art.

In accordance with these objectives a composition within the scope of the present invention, Example 7, was prepared by blending equal weight amounts of SS ½sec. grade nitrocellulose and an EVA having a vinyl acetate concentration of 62 weight percent and a kinematic viscosity at 140° C. of 9,000 centipoise (Vynathene [trademark]EY 80069). This polymeric blend was dissolved by adding 90% by weight of a solvent blend of 12½% by volume cyclohexanone; 30% by volume isopropanol; 30% by volume methanol; and 27½% by volume n-butyl acetate.

For comparison, Comparison Example 5 was prepared. This comparison example involved preparation of a coating composition comprising a 10% SS½ sec.nnitrocellulose in 90% of the same solvent blend. A second comparison run, Comparison Example 6, comprised a coating composition including 10% solids of which 75% by weight was SS ½sec. nitrocellulose and 25% by weight of the same EVA utilized in Example 7 (Vynathene [trademark] EY 80069). As in Example 7 and Comparative Example 5, Comparative Example 6 utilized 90%. by weight of the solvent blend recited above.

Each of these coating compositions was applied to flame treated polyethylene surfaces and the resultant coatings were tested for adhesion and flexibility. The adhesion test was a standard test utilized for determination of this property, ASTM Test D-3359, Method B. In this test a rating is assigned, ranging from excellent adhesion, Rating 5 to poor adhesion, Rating 0. The coating compositions of Example 7, Comparative Example 5 and Comparative Example 6, were all judged to possess excellent adhesion and were assigned a rating of 5.

A second important characteristic of a coating composition is its flexibility. The flexibility of unsupported films is measurable with a M.I.T. Folding Endurance Tester, run in accordance with the procedure of ASTM D-2176. This test involves the repeated flexing of the unsupported coated film under fixed tension (400 gram load). The result of this test is reported as the number of double folds required to break the coating. The coating composition of the present invention, Example 7, was three times more flexible than the coatings of Comparative Examples 5 and 6.

This test establishes that although the coatings of the prior art provide an excellent adhesion on polyethylene surfaces, these coatings lack the degree of flexibility obtained by use of the coating composition of the present invention.

These polyethylene coating tests are tabulated in Table II below.

TABLE II

| Ex. No. | Comp. Solids* | Adhesion to Flame Treated Polyethylene (ASTM D-3359, Method B) | Flexibility (Unsupported Film) MIT Double Folds, 400 gram Load, 1 mil Thick Film (ASTM D-2176) |
|---|---|---|---|
| CE5 | Nitrocellulose only | 5, excellent | 485 |
| CE6 | 75% by weight Nitrocellulose 25% by weight EVA | 5, excellent | 500 |
| 7 | 50% by weight Nitrocellulose 50% by weight EVA | 5, excellent | 1,850 |

*Each at 10% solids in solvent blend of 12¼% by volume cyclohexanone
30% by volume isopropanol
30% by volume methanol
27¼% by volume n-butylacetate

EXAMPLE 8 AND COMPARATIVE EXAMPLE 7

Coating Compositions in High Alcohol Content Solvent

Two coating compositions, Example 8 and Comparative Example 7, were prepared. Each of the two coating compositions were exactly alike but for the identity of the 3.89% by weight of ethylene-vinyl acetate copolymer. In Example 8 an EVA having a 62% by weight VA and a kinematic viscosity at 140° C. of 9,000 centipoise (Vynathene [trademark]EY 80069) was utilized. In Comparative Example 7 the EVA was Vynathene [trademark] EY 902-30, an EVA characterized by 40 to 43% by weight VA and a kinematic viscosity at 140° C. of approximately 1,000,000 centipoise. Otherwise, the two coating compositions were identical. Both included 7.2% by weight of SS ½ sec. grade nitrocellulose and a solvent blend of cyclohexanone, isopropanol, n-butyl acetate and methanol having the same constituency as the solvent of Example 7 and Comparative Examples 5 and 6.

The coating compositions of Example 8 and Comparative Example 7 were blended overnight on a roll mill and their appearance, after blending, was noted. The coating composition of Example 8 was clear indicating complete dissolution. The coating composition of Comparative Example 7 evidenced slightly swollen pellets, indicating that the solvent system did not fully dissolve the polymer solids.

Upon application of the coating compositions on a flame treated polyethylene film substrate the dry film appearance of the coating composition of Example 8 was clear. The coating composition of Comparative Example 7, was not applied to the polyethylene film since the EVA component was not fully dissolved.

The results of this test are summarized in Table III.

TABLE III

| Coating Compositions | | |
|---|---|---|
| Example 8 | Comparative Ex. 7 | Concentration, % by Wt. |
| SS ½ sec. (dry basis) | SS ½ sec. (dry bases) | 7.22%, by wt. |
| EY 80069 | EY 902-30 | 3.89 |
| cyclohexanone | cyclohexanone | 11.33 |
| isopropanol | isopropanol | 31.33 |
| n-butyl acetate | n-butyl acetate | 23.33 |
| methanol | methanol | 22.89 |

| Results | |
|---|---|
| Example 8 | Comparative Ex. 7 |
| Solution Appearance: clear | vinyl pellets slightly swollen |
| Dried Film Appearance: clear | unapplied (coating contained undissolved EVA) |

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, this invention should be limited only by the appended claims.

What is claimed is:

1. A coating composition comprising nitrocellulose; a copolymer consisting essentially of ethylene and an ethylenically unsaturated ester of a saturated fatty acid, said copolymer comprising between about 40% and about 90% by weight of said ester, said copolymer characterized by a kinematic viscosity at 140° C. of up to about 30,000 centipoise, said copolymer present in a range of between more than about 25% and about 60% by weight, based on the total weight of said nitrocellulose and said copolymer; and an organic solvent for said nitrocellulose and said copolymer.

2. A composition in accordance with claim 1 wherein said copolymer comprises between about 50% and about 80% by weight of said ester and characterized by a kinematic viscosity at 140° C. of between about 1,500 and about 30,000 centipoise, said copolymer comprising between about 30% and about 50% by weight, based on the total weight of said nitrocellulose and said copolymer.

3. A composition in accordance with claim 2 wherein said ethylenically unsaturated ester of a saturated fatty acid is vinyl acetate.

4. A composition in accordance with claim 3 wherein said ethylene-vinyl acetate copolymer comprises between about 55% and about 65% by weight vinyl acetate and is characterized by a kinematic viscosity at 140° C. of between about 3,000 and about 30,000 centipoise, said ethylene-vinyl acetate copolymer comprising between about 35% and about 45% by weight, based on the total weight of said nitrocellulose and said ethylene-vinyl acetate copolymer.

5. A composition in accordance with claim 1 wherein said nitrocellulose is characterized by a nitrogen content in the range of between about 10.9% and about 12.2% by weight, based on the total weight of said nitrocellulose.

6. A composition in accordance with claim 5 wherein said nitrocellulose is characterized by a nitrogen content in the range of between about 10.9% and about 11.2% by weight, based on the total weight of said nitrocellulose.

7. A composition in accordance with claim 5 wherein said nitrocellulose is characterized by a nitrogen content in the range of between about 11.8% and about 12.2% by weight, based on the total weight of said nitrocellulose.

8. A coating composition comprising nitrocellulose, said nitrocellulose characterized by a nitrogen content in the range of between about 10.9% and about 12.2% by weight, based on the total weight of said nitrocellulose; a copolymer consisting essentially of ethylene and vinyl acetate having a kinematic viscosity at 140° C. of about 8,000 to about 9,000 centipoise, said copolymer comprising about 60% by weight vinyl acetate; and an organic solvent for said nitrocellulose and said vinyl acetate; said composition characterized by said copolymer comprising about 40% by weight, based on the total weight of said nitrocellulose and said copolymer.

9. A composition in accordance with claim 8 wherein said nitrocellulose is characterized by a nitrogen content of between about 10.9% and about 11.2% by weight, based on the total weight of said nitrocellulose.

10. A composition in accordance with claim 8 wherein said nitrocellulose is characterized by a nitrogen content of between about 11.8% and about 12.2% by weight, based on the total weight of said nitrocellulose.

* * * * *